United States Patent [19]

Freeman

[11] 4,148,228

[45] Apr. 10, 1979

[54] VARIABLE SPEED FISHING REEL

[76] Inventor: James W. Freeman, 690 Mesa Way, Richmond, Calif. 94085

[21] Appl. No.: 798,826

[22] Filed: May 20, 1977

Related U.S. Application Data

[63] Continuation of Ser. No. 715,230, Aug. 18, 1976, which is a continuation of Ser. No. 529,441, Dec. 4, 1974, abandoned.

[51] Int. Cl.² ............................................. F16H 1/28
[52] U.S. Cl. ......................................... 74/789; 74/438
[58] Field of Search ................ 74/801, 804, 805, 332, 74/438, 789, 792; 242/211, 212, 213, 84.51

[56] References Cited

U.S. PATENT DOCUMENTS

| 1,740,010 | 12/1929 | Engelhardt | 74/805 |
| 2,059,765 | 3/1936 | Adams | 242/84.51 |
| 2,417,732 | 3/1947 | Bland et al. | 242/84.51 X |

Primary Examiner—Samuel Scott
Assistant Examiner—Frank H. McKenzie, Jr.

[57] ABSTRACT

A fishing reel with an automatic transmission which causes the spool to turn between a one to one speed ratio with the handle to a three to one speed ratio. This is accomplished by an automatic transmission and associated clutch and brake elements.

8 Claims, 7 Drawing Figures

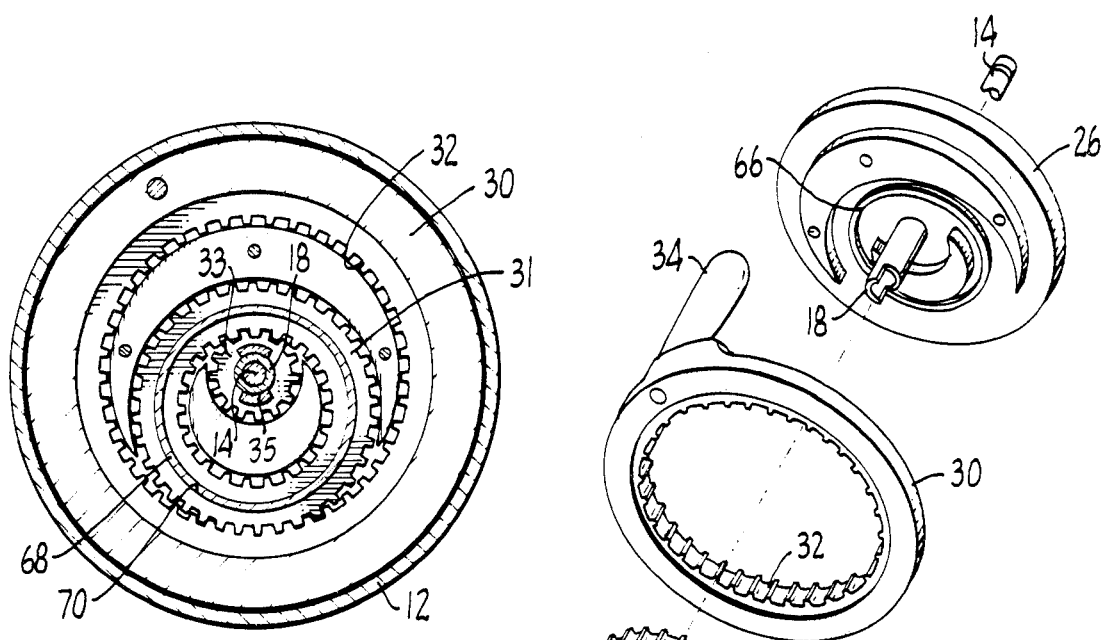
FIG. 4.
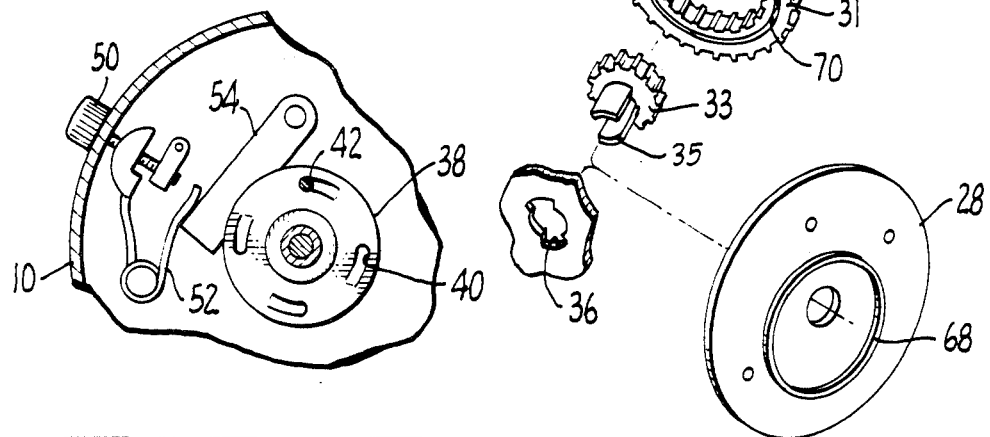
FIG. 6.
FIG. 5.
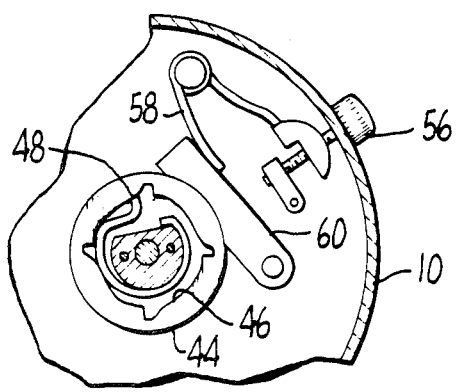
FIG. 7.

VARIABLE SPEED FISHING REEL

RELATED APPLICATIONS

This application is a continuation of my co-pending application Ser. No. 715,230, filed Aug. 18, 1976, which in turn was a continuation of my co-pending application Ser. No. 529,441, filed Dec. 4, 1974, now abandoned.

SUMMARY OF THE INVENTION

The essential object of the invention is to provide a fishing reel in which the spool turns slowly when line is paid out or retrieved under load conditions and in which the spool rotates rapidly when the line is being paid out or retrieved under essentially no-load conditions.

A further object of the invention is to provide a novel automatic transmission usable with vehicles and with other drive systems, as well as with fishing reels.

These and other objects and advantages of the invention will be apparent from the following description taken in conjunction with the drawings forming part of the specification, and in which:

FIG. 4 is a view in reduced size taken along lines 4—4 of FIG. 1;

FIG. 5 is an exploded view in perspective of the parts shown in FIG. 4;

FIG. 6 is a partial view taken along lines 6—6 of FIG. 1; and

FIG. 7 is a partial view taken along lines 7—7 of FIG. 1.

Figures 1, 2, 3:
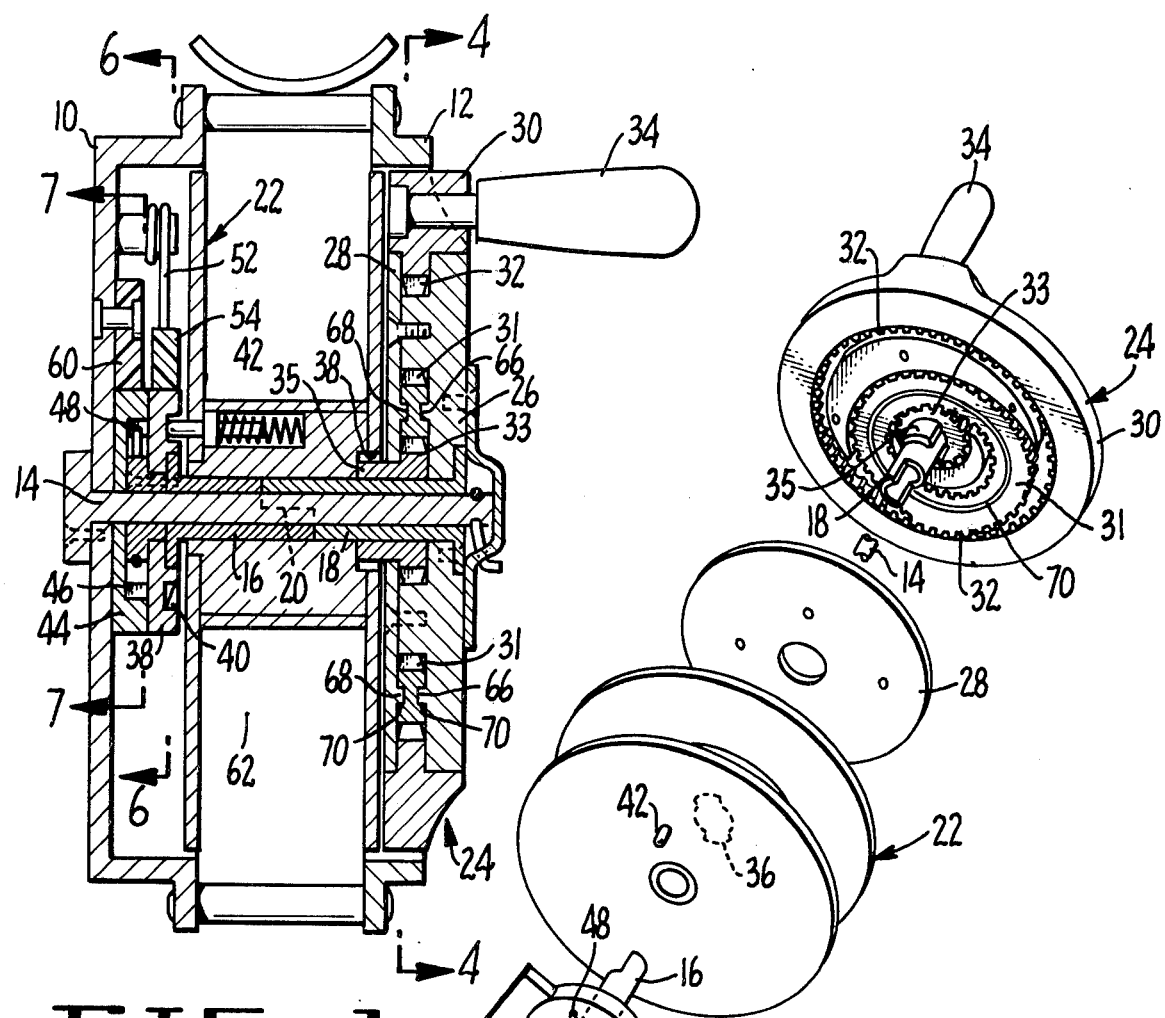
FIG. 1 is a view in section of a fishing reel embodying the invention, taken along a vertical plane intersecting the axis of revolution of the reel.
FIG. 2 is an exploded view in perspective of the reel of FIG. 1.
FIG. 3 is a exploded view in perspective of the adjustable brake means.

With reference to the drawings, particularly to FIGS. 1 and 2, the reel comprises stationary housing parts 10 and 12, a shaft 14 fixedly but removably attached to housing part 10, half-shaft elements 16 and 18 sleeved on shaft 14 and drivably interconnected at 20, line spool 22 rotatably mounted on half-shafts 16 and 18, transmission 24 comprising interconnected casing members 26 and 28, ring 30 having ring gear 32 and handle 34, planetary gear 31, sun gear 33 having a connection 35, 36 (FIG. 5) with reel 22, brake wheel 38 freely mounted on half-shaft 16 and having recesses 40 cooperating with a spring-urged pin 42 carried by reel 22, and brake wheel 44 having a one-way connection with half-shaft 16 comprising camway 46 formed in the wheel and spring detent 48 carried by hub 49 of half-shaft 16. The half-shaft 18 is fixedly connected to transmission casing member 26. Wheel 38 is provided with an independent friction brake (FIG. 6) comprising adjustment member 50, spring 52 and brake shoe 54. Wheel 44 is provided with an independent friction brake (FIG. 7) comprising adjustment member 56, spring 58 and brake shoe 60.

The reel is operable in the following manner, with particular reference to FIG. 2 wherein when reel 22 rotates in the clockwise direction the fishing line 62 is being fed out of the reel and wherein when reel 22 is rotated in the counter-clockwise direction the line is being retrieved or fed back onto the reel.

When the line 62 is being paid out, i.e. when the handle 34 and the reel 22 are being rotated in the clockwise direction in FIG. 2, there is normally a one to one drive ratio between the handle ring 30 and the spool 22 through the following drive train: clockwise movement of ring gear 32; clockwise movement of planetary gear 31; clockwise movement of sun gear 33 and consequent clockwise movement of connector means 35, 36 and reel 22. Thus, when the pull on the line exceeds the braking force of brake unit 54 and line is consequently being paid out, the transmission is normally "locked up" and there is a one to one drive ratio between reel 22 and the handle-bearing ring 30.

Line cannot be paid out unless the torque applied to the spool 22, either through the handle 34 as described or by a pull on the line 62, exceeds the braking force of brake member 54 on wheel 38. When line is being paid out, wheel 38 travels with the spool 22 and the drag effect of brake 54 is not applied to the half-shafts 16 and 18. The action of brake member 54 on wheel 38 during line payout operates to prevent backlash of the line. During this one to one drive and payout of the line, i.e. during "lockup" of the transmission and consequent rotation of the casing element or cage 26 along with the ring 30 carrying the handle 34, the half-shaft hub 49 carrying detent 48 rotates within the camway 46 of wheel 44 which is held stationary by brake member 60, the detent 48 in camway 46 serving as a click-stop device during line payout.

The other extreme of operation of the reel is when the line is being reeled in under a condition in which the pull on the line has dropped off to zero, e.g. when a hooked fish rapidly approaches the reel operator. Under these conditions the spool 22 is moved in a counter-clockwise (FIG. 2) or line retrieval direction at a ratio of approximately three turns of the spool for one turn of the handle 34 through the following drive train: counter-clockwise movement of ring gear 32; counter-clockwise rotation of planetary gear 31; counter-clockwise rotation of sun gear 33; and counter-clockwise rotation of reel 22.

Under these three to one drive conditions of line retrieval, wheel 44 remains stationary under the influence of brake member 60 and the camway 46 of the wheel 44 by positively engaging detent 48 prevents rotation of the half-shafts 16 and 18 and consequently of the casing members 26 and 28, or cage.

During line retrieval, the rotation of spool 22 relative to the wheel 38 which is held stationary by brake member 54 causes the pin 42 to give click-stop signals as it moves around relative to the cam-shaped recesses 40.

The subject transmission employs novel positioning and mounting means for the planetary ring gear 31. Annular ridges 66 and 68 formed on casing members 26 and 28 are received within annular grooves 70 in the faces of the planetary gear ring 31 to position and guide gear ring 31.

In summary, when a torque is being applied to the spool, as by a fish pulling on the line and causing the line to be paid out or as by a drag on the line while the line is being reeled in, the cage, handle and spool all rotate together in a one to one ratio. When there is no torque applied to the spool, as when the line is being paid out under a no-load condition by operation of the handle or when the line is being reeled in by handle operation and there is no load on the line, the casing will be stationary and the spool will turn approximately three times for one turn of the handle. The setting of the brake 60 determines the transition point between one to one and three to one operation during line retrieval operation of the reel.

What is claimed is:

1. A transmission comprising opposed casing members forming a cage, an outer ring gear member carried for rotation by said cage, a sun gear member carried for rotation by said cage, the outer ring gear and the sun gear being concentric to each other, an annular inner ring gear having gear teeth at its outer periphery and gear teeth at its inner periphery, the outer periphery being in mesh in a first zone with the outer ring gear member and the inner periphery being in mesh in a second zone with the sun gear, the two zones being 180° offset, guide means within said cage to maintain the eccentric position of said inner ring gear within said cage, said cage having a shaft affixed thereto, a wheel-like member sleeved on said shaft and rotatable relative to said shaft, and a two-way drive connection between said sun gear member and said wheel-like member.

2. The invention according to claim 1, an annular clutch plate mounted concentrically with respect to said shaft and rotatable relative to said shaft, a one-way drive connection between said clutch plate and said wheel-like member, and an adjustable brake member engageable with said clutch plate and operable to apply thereto a drag force opposing the rotation thereof imparted by said one-way drive connection.

3. The invention according to claim 2, a second annular clutch plate mounted concentrically with respect to said shaft and rotatable relative to said shaft, a second one-way drive connection between said second plate and said shaft, said second one-way drive connection being operative to rotate said second plate when said cage and its shaft and said wheel-like member are being rotated in the same predetermined direction, said same predetermined direction being the one in which said first-mentioned one-way drive connection is inoperable to rotate said first-mentioned clutch plate, and an adjustable brake member engageable with said second clutch plate and operable to apply thereto a variable drag force tending to oppose rotation thereof imparted by said second one-way drive connection.

4. The invention according to claim 3, including drive means connected to said outer ring gear member whereby the same may be rotated selectively in either direction of rotation.

5. The invention according to claim 1, an annular clutch plate mounted concentrically with respect to said shaft for rotation, a one-way drive connection between said shaft and said clutch plate, and an adjustable brake member engageable with said clutch plate and operable to apply thereto a variable drag force opposing the rotation thereof imparted by said shaft through said one-way drive connection whereby a braking effect may be applied to said cage to hold the cage stationary and cause the said wheel-like member to turn a multiple of times per turn of said outer ring gear member.

6. The invention according to claim 5, said transmission being operable, under the influence of a torque applied to said wheel-like member to either tend to rotate said wheel-like member in one direction or to resist the rotation of said wheel-like member in the other direction, to cause said wheel-like member and said outer ring gear to rotate in a one to one speed ratio.

7. A transmission comprising opposed casing members forming a cage, means supporting said cage for rotation, intermediate gear means comprising a first gear member carried for rotation by said cage and a second gear member carried for rotation by said cage, means selectively operable to restrain said cage against rotation and to free said cage for rotation, and input and output gear members associated with said cage in mesh respectively with said first and second gear members operable when said cage is restrained against rotation to cause said output gear member to rotate a plurality of times for each rotation of said input gear member and operable when said cage rotates to cause said output gear member to turn in a one to one speed ratio with said input gear member.

8. A transmission comprising opposed casing members forming a cage, housing means supporting said cage for rotation, brake means adapted to selectively secure said cage against rotation relative to said housing means, intermediate gear means comprising a first gear member carried for rotation by said cage and a second gear member carried for rotation by said cage, input and output gear members associated with said cage in mesh respectively with said first and second gear members, a shaft attached to said cage, a wheel-like member sleeved on said shaft and rotatable relative to said shaft, and a two-way drive connection between said output gear member and said wheel-like member, said gear members being operable when said cage is secured by said brake means against rotation relative to said housing means to turn said wheel-like member a plurality of times per turn of said input gear member and being operable when said cage is rotated freely relative to said housing means to turn said wheel-like member and said input gear member in a one to one speed ratio.

* * * * *